(12) United States Patent
Fukano et al.

(10) Patent No.: US 8,973,453 B2
(45) Date of Patent: Mar. 10, 2015

(54) FEED SCREW MECHANISM

(75) Inventors: Yoshihiro Fukano, Moriya (JP); Toru Sugiyama, Abiko (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 364 days.

(21) Appl. No.: 13/004,256

(22) Filed: Jan. 11, 2011

(65) Prior Publication Data

US 2011/0174100 A1 Jul. 21, 2011

(30) Foreign Application Priority Data

Jan. 18, 2010 (JP) ................................. 2010-008297

(51) Int. Cl.
*F16H 25/24* (2006.01)
*F16H 25/22* (2006.01)

(52) U.S. Cl.
CPC ............ *F16H 25/24* (2013.01); *F16H 25/2204* (2013.01); *F16H 2025/2445* (2013.01)
USPC ...... 74/89.36; 74/89.32; 74/89.33; 74/474.78

(58) Field of Classification Search
CPC ................ F16H 25/2204; F16H 25/24; F16H 2025/2445
USPC .................................. 74/89.36, 89.32, 89.33
See application file for complete search history.

(56) References Cited

U.S. PATENT DOCUMENTS

| 2,982,145 | A | * | 5/1961 | Orner | 74/89.33 |
| 3,023,631 | A | * | 3/1962 | Curtis | 74/89.32 |
| 3,464,283 | A | * | 9/1969 | Miller et al. | 74/89.36 |
| 3,665,782 | A | * | 5/1972 | Loftus | 74/89.36 |
| 3,745,840 | A | * | 7/1973 | Guralnick | 74/89.32 |
| 4,302,981 | A | * | 12/1981 | Wayman | 74/89.36 |
| 4,483,209 | A | * | 11/1984 | Dietrich et al. | 74/89.36 |
| 4,530,251 | A | * | 7/1985 | Henle | 74/89.36 |
| 5,329,825 | A | * | 7/1994 | Askins | 74/89.32 |
| 5,333,905 | A | * | 8/1994 | Watanabe | 280/801.2 |
| 7,258,029 | B2 | * | 8/2007 | Erker | 74/89.36 |

(Continued)

FOREIGN PATENT DOCUMENTS

| JP | 58-170448 | 11/1983 |
| JP | 63-290988 | 11/1988 |
| JP | 3-7442 | 1/1991 |
| JP | 4-117247 | 10/1992 |
| JP | 5-90014 | 12/1993 |

(Continued)

OTHER PUBLICATIONS

Office Action issued Feb. 7, 2012, in Japanese Patent Application No. 2010-008297 (with partial English-language translation).

(Continued)

*Primary Examiner* — William Kelleher
*Assistant Examiner* — Valentin Craciun
(74) *Attorney, Agent, or Firm* — Oblon, McClelland, Maier & Neustadt, L.L.P.

(57) ABSTRACT

A feed screw mechanism includes a feed screw shaft connected to a drive source and formed with first screw threads on an outer circumferential surface thereof, and a displacement nut, which is screw-engaged with respect to the feed screw shaft through a plurality of balls. The displacement nut is supported with respect to a slider that makes up an electric actuator by a pair of pins. The pins are inserted and fixed in first pin holes formed in the slider, and distal end portions of the pins are inserted respectively into second pin holes formed in the displacement nut.

7 Claims, 11 Drawing Sheets

(56) References Cited

U.S. PATENT DOCUMENTS

| | | | |
|---|---|---|---|
| 7,444,900 B2* | 11/2008 | Tomaru et al. | 74/495 |
| 8,495,924 B2* | 7/2013 | Fukano et al. | 74/89.23 |
| 2001/0025534 A1* | 10/2001 | Gladen | 74/89.36 |
| 2001/0036080 A1* | 11/2001 | Shirai | 362/460 |
| 2002/0020234 A1* | 2/2002 | Smith et al. | 74/89.36 |
| 2002/0063014 A1* | 5/2002 | Yoshida et al. | 180/444 |
| 2004/0089084 A1* | 5/2004 | Erker | 74/89.36 |
| 2004/0194570 A1* | 10/2004 | Tomaru et al. | 74/495 |
| 2006/0156838 A1* | 7/2006 | Las Navas Garcia | 74/89.23 |
| 2007/0262576 A1* | 11/2007 | Tomaru et al. | 280/775 |
| 2009/0260463 A1* | 10/2009 | Fukano et al. | 74/89.33 |
| 2009/0282935 A1* | 11/2009 | Synovzik | 74/89.36 |
| 2010/0258770 A1* | 10/2010 | Nishitsuji et al. | 254/98 |

FOREIGN PATENT DOCUMENTS

| | | |
|---|---|---|
| JP | 2001-116100 A | 4/2001 |
| JP | 2008-248938 | 10/2008 |
| JP | 2009-270709 | 11/2009 |

OTHER PUBLICATIONS

Japanese Office Action Issued Nov. 13, 2012 in Patent Application No. 2010-008297 (with English translation of pertinent portion).

Office Action issued Jun. 9, 2014, in Chinese Patent Application No. 201110027763.1(with English language translation).

Japanese Office Action mailed Sep. 10, 2013 in Japanese Patent Application No. 2010-008297 (with partial English-language translation).

* cited by examiner

FEED SCREW MECHANISM

CROSS-REFERENCE TO RELATED APPLICATION

This application is based upon and claims the benefit of priority from Japanese Patent Application No. 2010-008297 filed on Jan. 18, 2010, of which the contents are incorporated herein by reference.

BACKGROUND OF THE INVENTION

1. Field of the Invention

The present invention relates to a feed screw mechanism for displacing a displaceable body, which is screw-engaged with a feed screw shaft, along an axial direction under a driving action of a rotary drive source.

1. Description of the Related Art

Heretofore, a feed screw mechanism has been known, which is equipped with a screw shaft engraved with screw threads on an outer circumferential surface thereof, a cylindrical nut member disposed on an outer circumferential side of the screw shaft, and balls, which are disposed via the screw threads between the screw shaft and the nut member.

Such a feed screw mechanism, as disclosed in Japanese Laid-Open Patent Publication No. 2008-248938, is applied to an actuator, in which a displacement nut is fixed via balls to a slider that constitutes the actuator. In addition, by rotating the screw shaft under a driving action of a drive motor, the displacement nut is displaced in a straight line along the screw shaft, and together therewith, the slider, which is fixed to the displacement nut, also is displaced in a straight line.

However, in the conventional art described above, in the event that bending, warping or the like occurs in the screw shaft that constitutes the feed screw mechanism, or if variances occur due to product differences or assembly errors in the screw shaft and the displacement nut, defects in operation of the displacement nut caused by such variances tend to occur. Thus, in order to resolve and eliminate the aforementioned operational defects, when the screw shaft and the displacement nut are assembled, work to perform adjustments thereon is required, thereby complicating assembly operations of the feed screw mechanism.

SUMMARY OF THE INVENTION

A general object of the present invention is to provide a feed screw mechanism, which with a simple structure can enable a displaceable body to be displaced smoothly, while also improving and facilitating ease of assembly thereof.

According to the present invention, there is provided a feed screw mechanism for use in an actuator and having a slider which is displaceable along an axial direction of a body, comprising a feed screw shaft engraved with screw threads on an outer circumference thereof, a displaceable body screw-engaged with the screw threads and disposed on an outer circumferential side of the feed screw shaft, and a support mechanism that supports the displaceable body for displacement relatively with respect to the slider.

According to the present invention, the displaceable body that makes up the feed screw mechanism is supported by the support mechanism with respect to the slider of the actuator in which the feed screw mechanism is used, and the displaceable body is capable of being displaced relatively with respect to the slider. Accordingly, even in the case of assembly errors, for example, in which the feed screw shaft becomes bent or the like, the displaceable body, as a result of relative displacement thereof with respect to the slider through the support mechanism, can suitably absorb any variances due to bending of the feed screw shaft or the like. Consequently, even in the case of product differences or assembly errors in the feed screw mechanism, application of uneven loads caused by such errors with respect to the slider is prevented, an increase in displacement resistance of the slider can be avoided, and the slider can be displaced smoothly along the body.

Further, because resistance is decreased when the slider is displaced, noise that occurs upon driving of the feed screw mechanism can also be lessened.

Moreover, when the feed screw mechanism is assembled with respect to the actuator, it is unnecessary to perform adjustment operations in response to product differences or assembly errors such as bending, warping or the like of the feed screw shaft, and since assembly operations can be carried out easily, ease of assembly of the actuator can be improved.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A preferred embodiment of a feed screw mechanism according to the present invention shall be presented and described in detail below with reference to the accompanying drawings.

Figure 1:
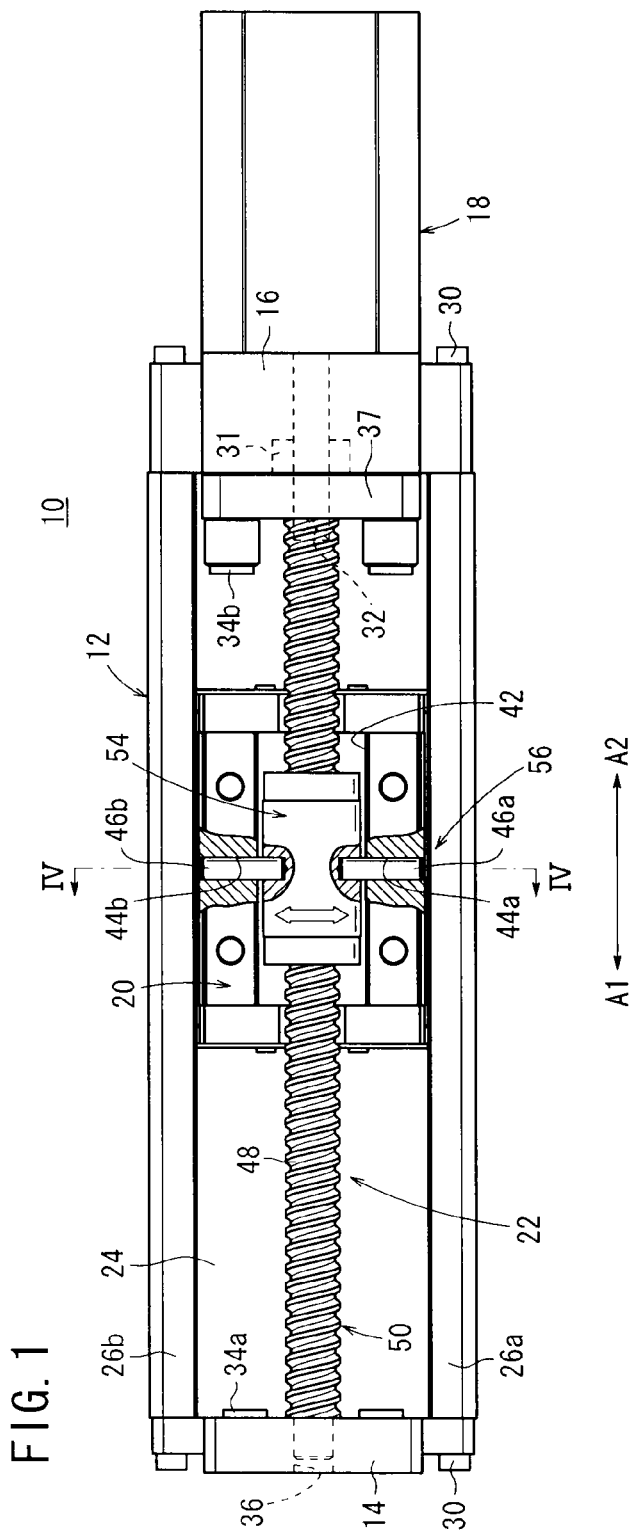
FIG. 1 is an overall plan view of an electric actuator to which a feed screw mechanism according to a first embodiment of the present invention is applied.
Figure 2:
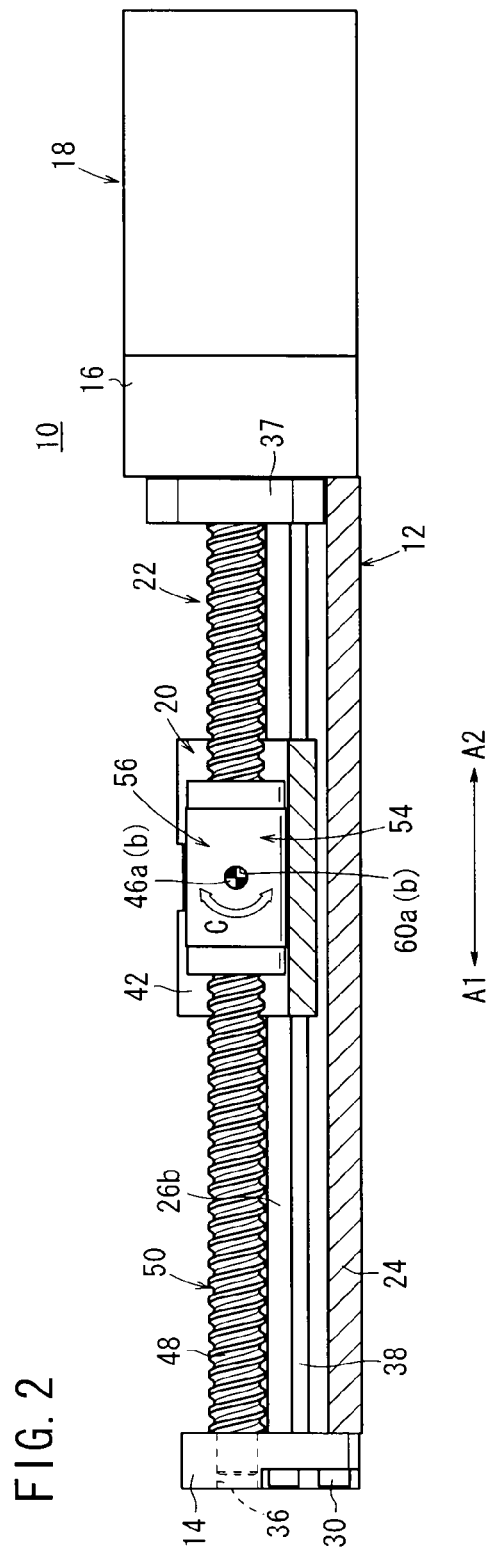
FIG. 2 is a side view, partially in cross section, of the electric actuator shown in FIG. 1.

In FIG. 1, reference numeral 10 indicates an electric actuator to which a feed screw mechanism according to a first embodiment of the present invention is applied.

As shown in FIGS. 1 through 6, the electric actuator 10 includes a frame (body) 12, an end plate 14 connected to one end of the frame 12, a drive source (driving unit) 18, which is driven rotatably, connected through a housing 16 to the other end of the frame 12, a slider 20 disposed for displacement along the frame 12, and a feed screw mechanism 22 disposed in the interior of the frame 12 and which transmits a driving force of the drive source 18 to the slider 20.

The frame 12 includes a plate-shaped base 24 having a predetermined length extending along the longitudinal direction (the direction of arrows A1 and A2), and a pair of upstanding guide members 26a, 26b disposed on opposite sides of the base 24. The guide members 26a, 26b are formed respectively with predetermined heights perpendicular to and upwardly with respect to the base 24. More specifically, the frame 12 is formed with a U-shape in cross section by forming the base 24 and the guide members 26a, 26b integrally (see FIG. 4).

On inner wall surfaces of the guide members 26a, 26b, first guide grooves 28 are formed respectively (see FIG. 4) for guiding the slider 20 along the axial direction (the direction of arrows A1 and A2) of the guide members 26a, 26b. The first guide grooves 28, for example, are formed with semicircular shapes in cross section with respect to inner wall surfaces of the guide members 26a, 26b and extend along the axial direction (the direction of arrows A1 and A2).

The end plate 14 is connected by plural bolts 30 with respect to the other ends of the base 24 and the guide members 26a, 26b, such that the end plate 14 is disposed perpendicular to a direction of extension (the direction of arrows A1 and A2) of the frame 12.

Further, in a substantially central portion of the end plate 14, a support hole 36 is formed coaxially with the drive shaft 32 of the drive source 18, to be described later. Furthermore, on a side surface of the end plate 14, a pair of dampers 34a is formed facing toward the housing 16. The dampers 34a serve to prevent contact with the end plate 14 and shocks that otherwise would be generated when the slider 20 is displaced toward the side of the end plate 14 (in the direction of arrow A1).

The drive source 18 is made up from a rotary drive source such as a stepping motor or the like. The drive source 18 is rotatably driven a predetermined number of rotations, or by a predetermined angle of rotation, based on control signals from a non-illustrated controller.

In addition, the drive source 18 is connected to the frame 12 through the housing 16, which is equipped with a coupling or the like (not shown) at the interior thereof, and the drive shaft 32 of the drive source 18 is connected to one end of a feed screw shaft 50 via the aforementioned coupling.

In the interior of the housing 16, there is provided a bearing 31 that rotatably supports the feed screw shaft 50. The bearing 31 is retained by a pressure plate 37 mounted on the end surface thereof. The pressure plate 37 is disposed to face toward the end plate 14, with a pair of dampers 34b being disposed on a side surface of the pressure plate 37. In addition, the dampers 34b serve to prevent contact with the pressure plate 37 and shocks caused by contact therewith, which otherwise would be generated when the slider 20 is displaced toward the side of the housing 16 (in the direction of arrow A2).

Figure 4:
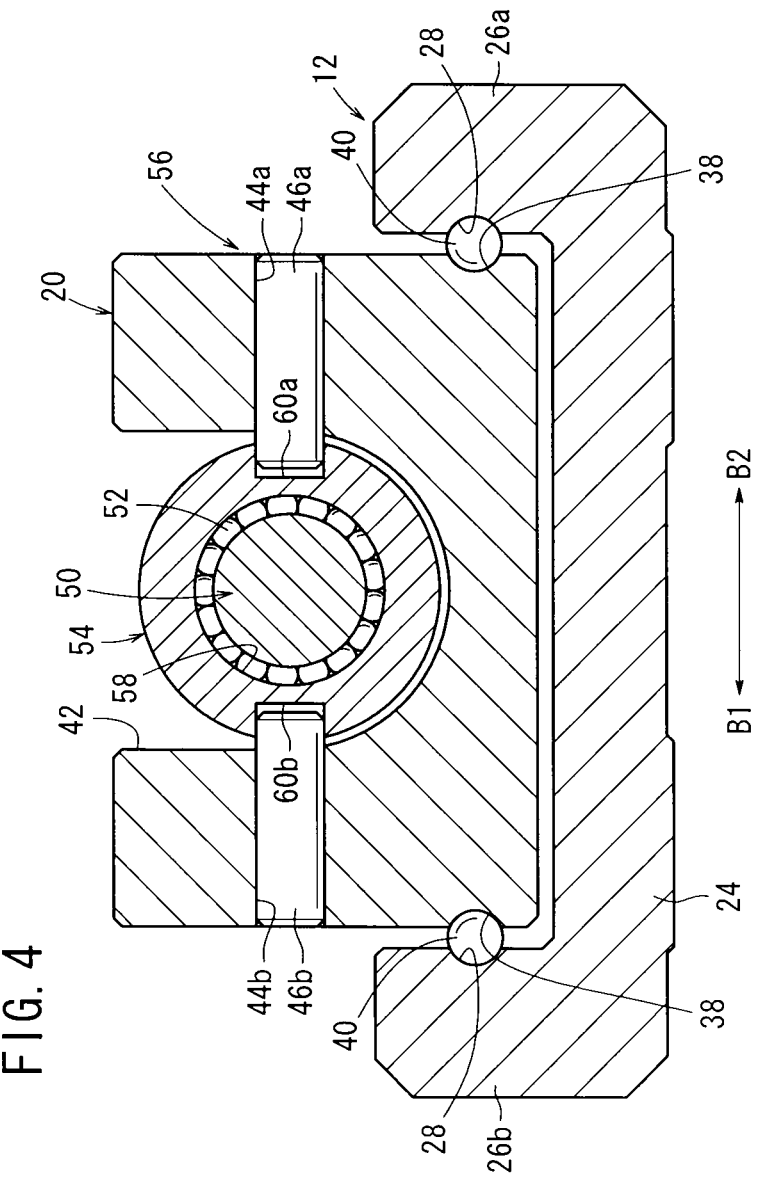
FIG. 4 is a cross sectional view taken along line IV-IV of FIG. 1.
Figure 5:
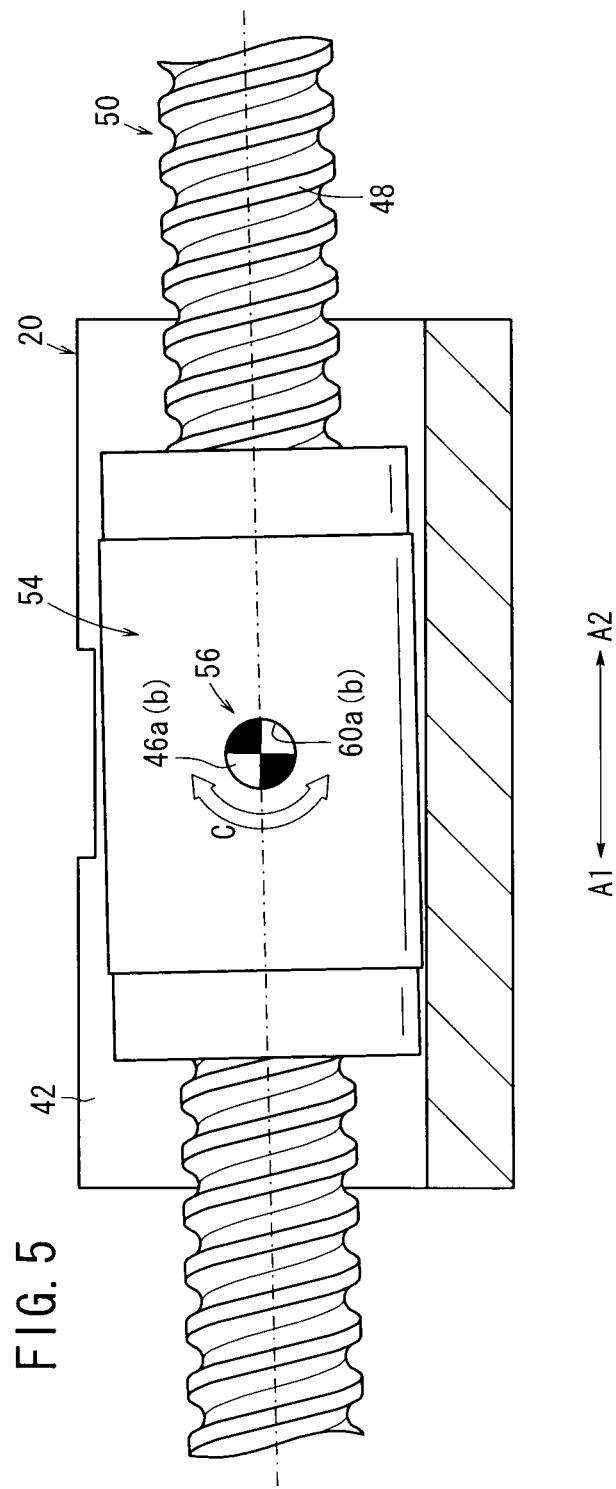
FIG. 5 is an enlarged side view showing a case in which the feed screw shaft and the displacement nut of FIG. 2 are tilted with respect to the slider about pins, which act as a fulcrum.

The slider 20 is arranged in the frame 12 inside a space, which is surrounded by the base 24 and the pair of guide members 26a, 26b. In addition, as shown in FIG. 4, when the slider 20 is arranged with respect to the frame 12, two second guide grooves 38, which are disposed on respective side surfaces of the slider 20, are arranged to face toward the first guide grooves 28 of the frame 12, and a plurality of guide bodies 40 are disposed between the second guide grooves 38 and the first guide grooves 28. Owing thereto, the slider 20 is guided in the axial direction (the direction of arrows A1 and A2) along the frame 12 via the plural guide bodies 40, which are spherical in shape.

Further, as shown in FIG. 4, the slider 20 is formed with a U-shape in cross section having a recess 42 that opens upwardly. The recess 42 is formed in a central portion in the width direction of the slider 20 and extends through the slider 20 along the axial direction (in the direction of arrows A1 and A2).

Moreover, a pair of first pin holes 44a, 44b is formed in the slider 20 perpendicularly to the direction in which the recess 42 extends (the direction of arrows A1 and A2). The first pin holes 44a, 44b are formed substantially centrally in the longitudinal dimension of the slider 20, and are formed so as to penetrate through to the recess 42 from opposite side surfaces of the slider 20. Together therewith, one of the first pin holes 44a and the other of the first pin holes 44b are formed on a straight line in a horizontal direction. Additionally, pins 46a, 46b, which make up a later-described support mechanism 56, are inserted respectively in the first pin holes 44a, 44b.

The feed screw mechanism 22 includes a feed screw shaft 50 connected to the drive shaft 32 of the drive source 18 and having first screw threads 48 engraved on an outer circumferential surface thereof, a displacement nut (displaceable body) 54 screw-engaged through a plurality of balls 52 with the feed screw shaft 50, and the support mechanism 56, which is disposed between the displacement nut 54 and the slider 20, and which retains the displacement nut 54 in a relatively displaceable manner with respect to the slider 20.

One end of the feed screw shaft 50 is connected to the drive shaft 32, whereas the other end is inserted through the support hole 36 disposed in the end plate 14 and is supported rotatably thereby. The feed screw shaft 50 is disposed coaxially with the aforementioned drive shaft 32. In addition, by rotary driving of the drive source 18, the feed screw shaft 50 is rotated together with the drive shaft 32.

Figure 3:
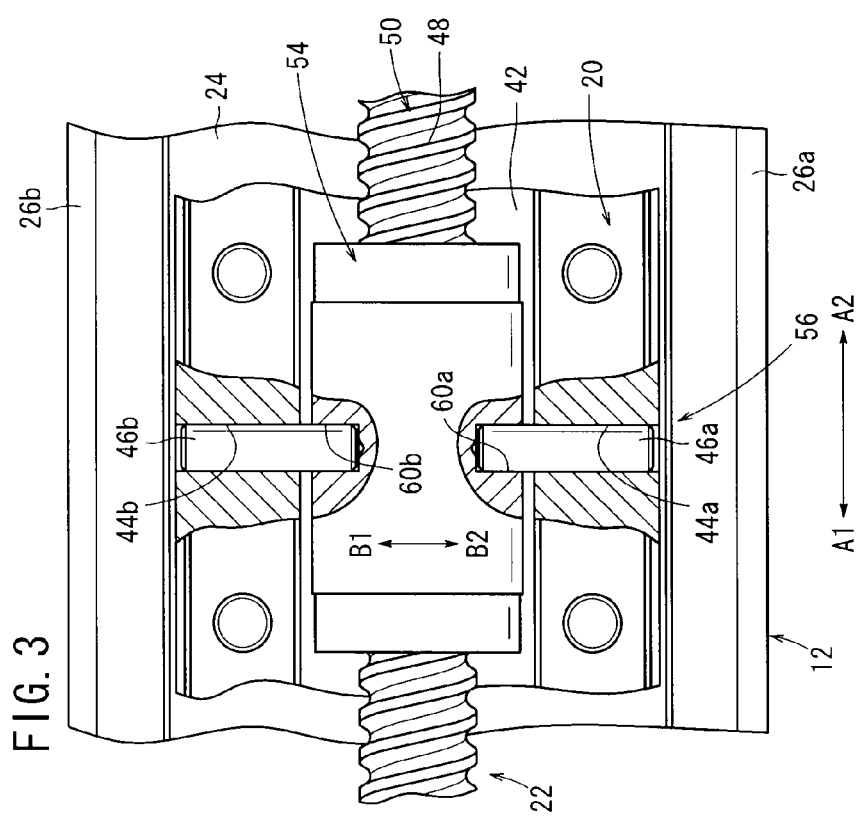
FIG. 3 is an enlarged plan view showing the vicinity of the slider and displacement nut illustrated in FIG. 1.

The displacement nut 54 is cylindrical in shape and is accommodated in the recess 42 of the slider 20. At this time, as shown in FIGS. 3 and 4, when the displacement nut 54 is accommodated in the recess 42, a clearance of a predetermined gap in the radial direction of the displacement nut 54 is provided between the outer circumferential surface of the displacement nut 54 and the inner wall surface of the recess 42.

In the interior of the displacement nut 54, second screw threads 58, in which a plurality of balls 52 are inserted facing the feed screw shaft 50, are formed along the axial direction (the direction of arrows A1 and A2). By insertion of the balls 52 respectively between the second screw threads 58, which are spirally engraved, and the first screw threads 48 of the feed screw shaft 50, the feed screw shaft 50 and the displacement nut 54 are screw-engaged with each other via the balls 52.

Further, a pair of second pin holes 60a, 60b is formed in the displacement nut 54 in a substantially central portion in the axial direction (the direction of arrows A1 and A2) of the displacement nut 54 and perpendicularly to the second screw threads 58. The second pin holes 60a, 60b extend toward the second screw threads 58 from the outer circumferential surface of the displacement nut 54, and are formed with predetermined depths so as not to penetrate through to the second screw threads 58. The second pin holes 60a, 60b are disposed mutually along a straight line.

The diameters of the second pin holes 60a, 60b are set to be the same or slightly greater than the diameters of the first pin holes 44a, 44b. End portions of pins 46a, 46b, which are inserted through the first pin holes 44a, 44b of the slider 20 on the outer circumferential side of the displacement nut 54, are inserted respectively into the second pin holes 60a, 60b of the displacement nut 54.

Further, when the displacement nut 54 is disposed in the recess 42 of the slider 20 with the clearance being arranged roughly uniformly along the outer circumferential surface of the displacement nut 54, the depths of the second pin holes 60a, 60b are set respectively so as to be slightly deeper than the depths at which the end portions of the pins 46a, 46b are inserted into the second pin holes 60a, 60b (see FIG. 4).

The pins 46a, 46b are formed with fixed diameters and predetermined lengths along the axial direction thereof, and are formed with diameters, which are the same or slightly larger than the inner circumferential diameters of the first pin holes 44a, 44b. In addition, the pins 46a, 46b are lightly press-inserted and fitted into the first pin holes 44a, 44b from respective sides of the slider 20. Ends of the pins 46a, 46b are fixed so as not to project from the outer end surface of the slider 20, whereas other ends thereof are arranged to project by a given length on the side of the recess 42 from the first pin holes 44a, 44b, and are inserted displaceably with respect to the second pin holes 60a, 60b, which are formed at least larger in diameter than the diameters of the pins 46a, 46b.

More specifically, the two pins 46a, 46b are fixed in the slider 20 through the first pin holes 44a, 44b, and support the displacement nut 54 displaceably in a horizontal direction (the direction of arrows B1 and B2) perpendicular to the displacement direction (the direction of arrows A1 and A2) of the displacement nut 54 via the second pin holes 60a, 60b. Together therewith, the pins 46a, 46b function as a support mechanism 56, which is capable of supporting the displacement nut 54 rotatably about the second pin holes 60a, 60b.

The electric actuator 10, to which the feed screw mechanism 22 according to the first embodiment of the present invention is applied, is constructed basically as described above. Next, explanations shall be made concerning a case in which the feed screw mechanism 22 is assembled with respect to the electric actuator 10.

First, in a condition in which the displacement nut 54 is screw-engaged with respect to the feed screw shaft 50, the feed screw mechanism 22 is transferred to the space in the interior of the frame 12, and the displacement nut 54 is arranged in the recess 42 of the slider 20. In addition, the two pins 46a, 46b are inserted respectively into the first pin holes 44a, 44b from opposite side surfaces of the slider 20, and the ends of the pins 46a, 46b are inserted into the second pin holes 60a, 60b of the displacement nut 54.

As a result, the displacement nut 54 is placed in a condition of being supported displaceably in the widthwise direction of the slider 20 (in the direction of arrows B1 and B2 in FIG. 4) with respect to the slider 20, which was mounted beforehand inside the frame 12, and rotatably in a direction of rotation (the direction of arrow C in FIG. 2) about the pins 46a, 46b.

Next, after the other end of the feed screw shaft 50 is inserted through the support hole 36 of the end plate 14, the one end of the feed screw shaft 50 is connected with respect to the drive shaft 32 of the drive source 18. At this time, for example, even in the event of assembly variances in the displacement nut 54, which is screw-engaged with a feed screw shaft 50 that may be bent, warped or the like, such variances (errors) are absorbed by relative displacement of the displacement nut 54 in horizontal and/or rotational directions with respect to the slider 20.

Figure 6:
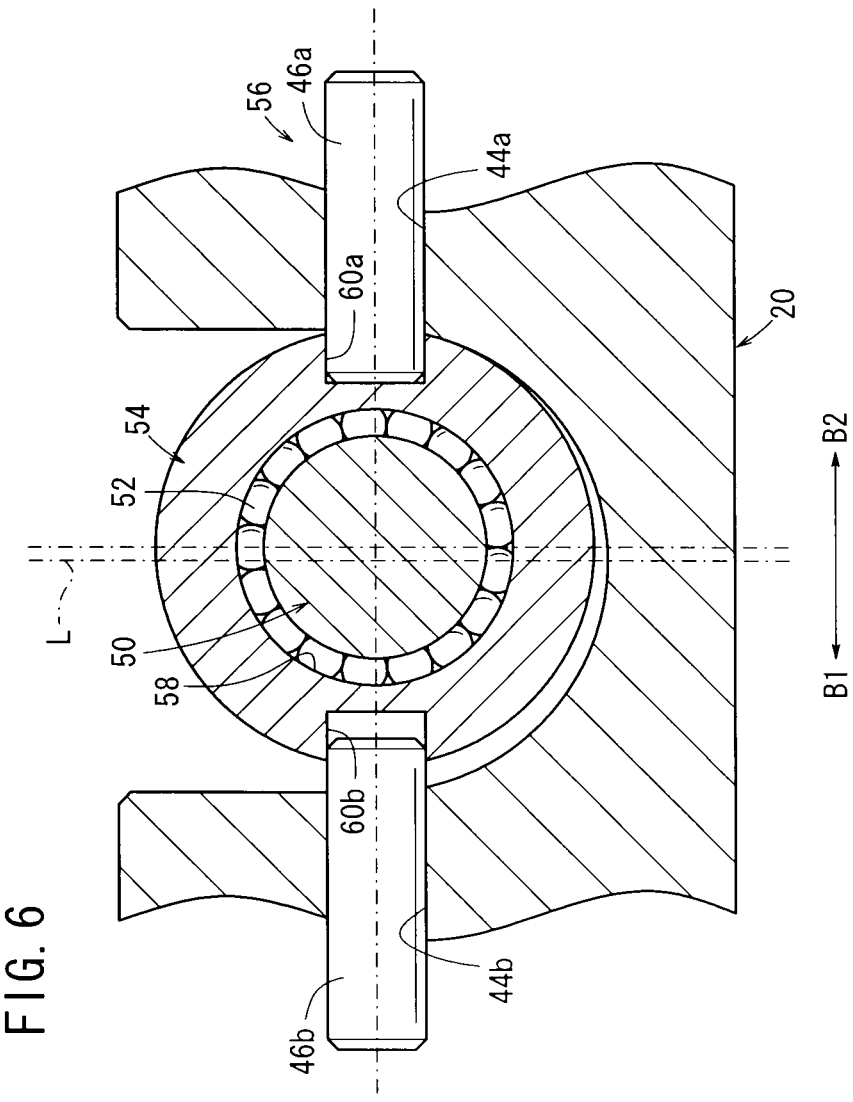
FIG. 6 is an enlarged cross sectional view showing a case in which the feed screw shaft and the displacement nut of FIG. 4 are displaced in a horizontal direction along the pins.

As shown in FIG. 6, for example, the displacement nut 54 is displaced toward the side of one of the pins 46a (in the direction of arrow B2) with respect to an axis line L of the slider 20, whereby errors and the like that occur in the feed screw mechanism 22 including the displacement nut 54 are absorbed suitably.

As a result, when the feed screw mechanism 22 including the feed screw shaft 50 is assembled with respect to the frame 12 and the slider 20 that make up the electric actuator 10, because the displacement nut 54 is disposed for displacement relatively with respect to the slider 20, the effect of variances due to product differences or assembly errors are not incurred, and the one end and the other end of the feed screw shaft 50 can be mounted reliably and suitably with respect to the drive source 18 and the end plate 14 that make up the electric actuator 10, so that the displacement nut 54 can be displaced reliably and smoothly along the feed screw shaft 50.

Further, because the displacement nut 54 can be displaced smoothly, noise that occurs upon operation of the electric actuator 10 can also be lessened.

Moreover, in the feed screw mechanism 22, because the aforementioned variances can suitably be absorbed, it becomes unnecessary to carry out complex adjustments to enable smooth operation of the displacement nut 54 along the feed screw shaft 50, so that ease of assembly thereof can be further improved.

Next, operations and effects of the electric actuator 10 including the feed screw mechanism 22 assembled in the foregoing manner shall be explained.

First, the drive source 18 is driven based on a control signal from a non-illustrated controller, and the feed screw shaft 50 is rotated through the drive shaft 32, whereby a rotary drive force of the feed screw shaft 50 is transmitted to the displacement nut 54, which is screw-engaged with the feed screw shaft 50 through the balls 52. Consequently, the displacement nut 54 is displaced straight along its axis in a direction (the direction of arrow A1) away from the drive source 18. Because the displacement nut 54 is supported on the slider 20 by the pair of pins 46a, 46b and displacement thereof in a direction of rotation is regulated, rotation of the displacement nut 54 together with rotation of the feed screw shaft 50 is prevented.

In other words, the pins 46a, 46b of the support mechanism 56 also serve as a rotation stopper for regulating rotation of the displacement nut 54 around the feed screw shaft 50. Thus, the displacement nut 54 is displaced only in its axial direction (in the direction of arrow A1) without rotation thereof.

Since the displacement nut 54 is supported on the slider 20 through the pair of pins 46a, 46b, the slider 20 is displaced together with the displacement nut 54 toward the side of the end plate 14 (in the direction of arrow A1) along the axial direction of the frame 12. The slider 20 reaches a terminal end position upon abutment thereof against the dampers 34a of the end plate 14.

On the other hand, by reversing characteristics of the control signal that is supplied to the drive source 18 from the non-illustrated controller, the feed screw shaft 50 is rotated in an opposite direction, and the rotary force of the feed screw shaft 50 is transmitted to the displacement nut 54, which is screw-engaged with the feed screw shaft 50 through the balls 52. Thus, the displacement nut 54 is displaced in a straight line in the axial direction of the feed screw shaft 50 (the direction of arrow A2) to approach the drive source 18.

In the foregoing manner, according to the first embodiment, the slider 20 is disposed displaceably along the axial direction of the frame 12, and the displacement nut 54, which is screw-engaged with the feed screw shaft 50 that is rotationally displaced upon driving of the drive source 18 and is disposed in the recess 42 of the slider 20, is disposed in the recess 42 with a clearance provided in the radial direction. Further, between the slider 20 and the displacement nut 54, the pair of pins 46a, 46b is provided, which are arranged perpendicularly with respect to the displacement direction (the direction of arrows A1 and A2) of the slider 20, and the displacement nut 54 is supported with respect to the slider 20 for displacement in a widthwise direction (the direction of arrows B1 and B2) of the slider 20, and for displacement in a direction of rotation (the direction of arrow C) with the pins 46a, 46b acting as a fulcrum.

Stated otherwise, the displacement nut 54 is disposed for displacement rotationally about an axis (base line) of the pins 46a, 46b, which is perpendicular to the axial line of the slider 20.

Consequently, for example, even in the case that bending or the like of the feed screw shaft 50 occurs, by relative displacement of the displacement nut 54 via the pair of pins 46a, 46b in two directions, i.e., in a widthwise direction of the slider 20 (horizontal direction) and in a direction of rotation with respect to the slider 20, any variances due to such bending of the feed screw shaft 50 or the like can suitably be absorbed.

As a result, application of uneven loads with respect to the slider 20, which are of concern when variances occur in the feed screw shaft 50, the displacement nut 54, or the like that make up the feed screw mechanism 22, can be prevented, and displacement resistance of the slider 20 caused by such uneven loads can more reliably and suitably be suppressed. Thus, the slider 20 can be displaced smoothly along the frame 12.

Further, when the feed screw mechanism 22 is assembled with respect to the electric actuator 10, because it is unnecessary to perform adjustment operations in response to product differences or assembly errors such as bending, warping or the like of the feed screw shaft 50, and since assembly operations can be carried out easily, ease of assembly of the electric actuator 10 can be improved.

Next, an electric actuator 102, to which a feed screw mechanism 100 according to a second embodiment is applied, is shown in FIGS. 7 through 11. Structural elements thereof, which are the same as those of the electric actuator 10, to which the feed screw mechanism 22 according to the aforementioned first embodiment is applied, are designated by the same reference characters and detailed explanations of such features shall be omitted.

Figure 7:
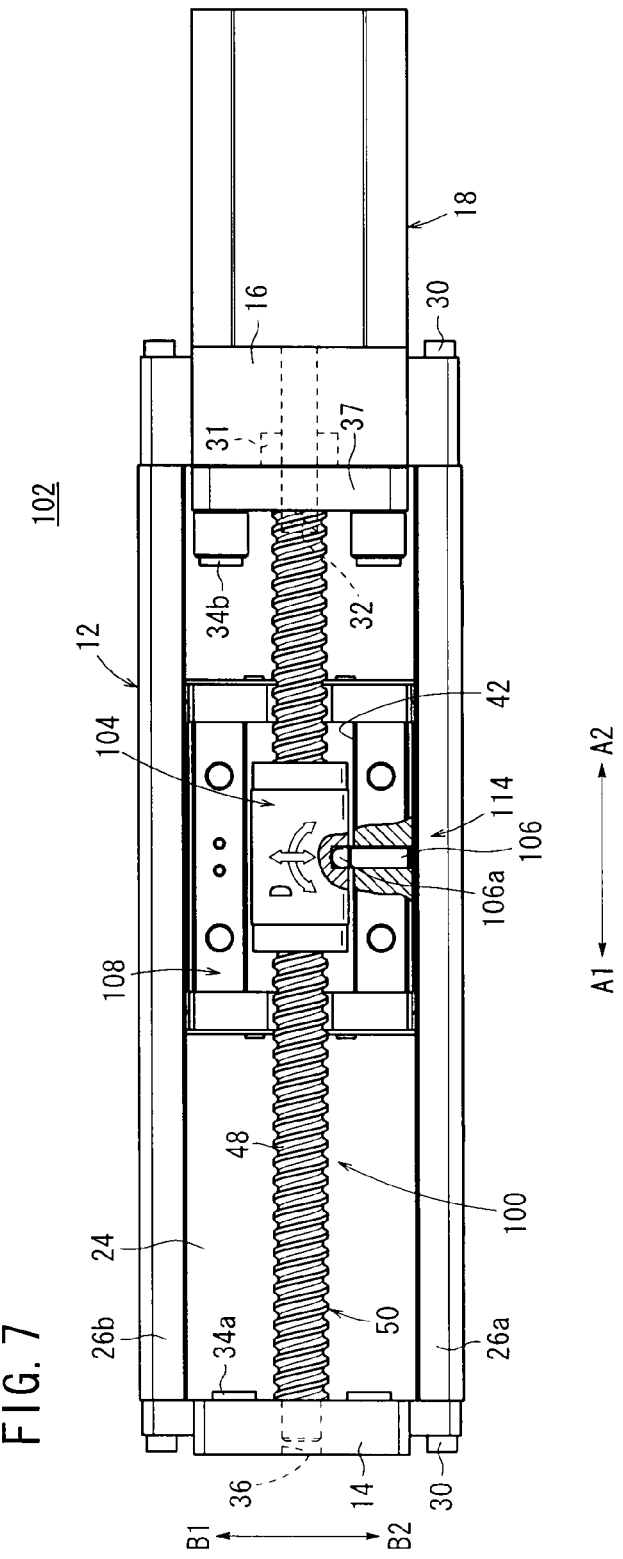
FIG. 7 is an overall plan view of an electric actuator to which a feed screw mechanism according to a second embodiment of the present invention is applied.
Figure 8:
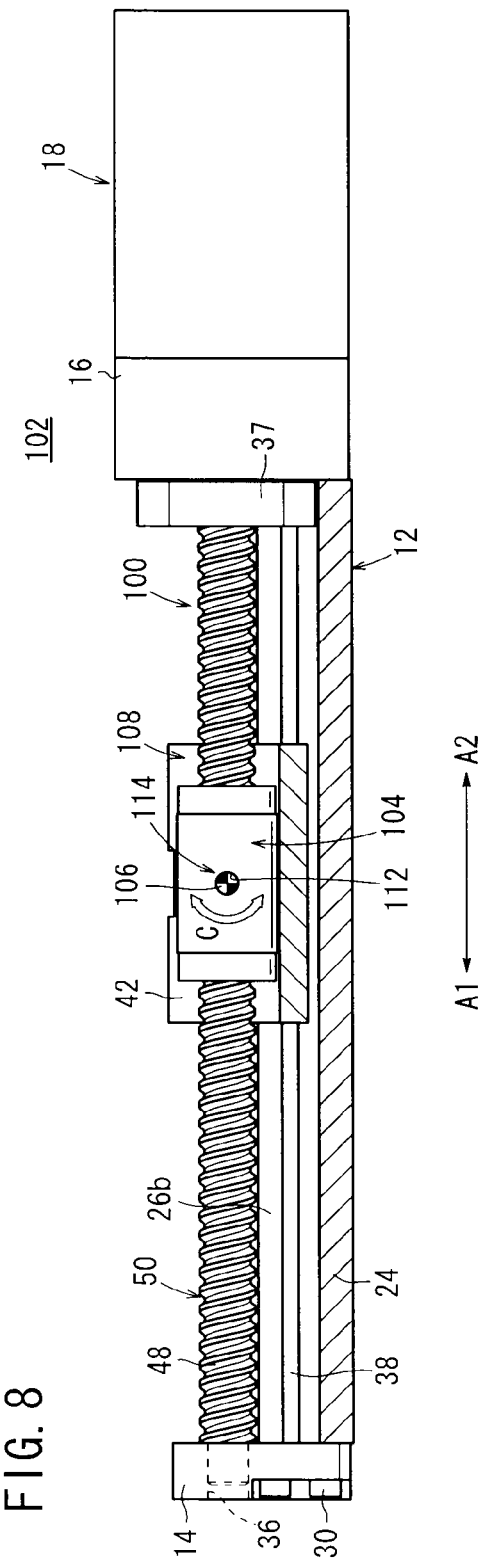
FIG. 8 is a side view, partially in cross section, of the electric actuator shown in FIG. 7.
Figure 9:
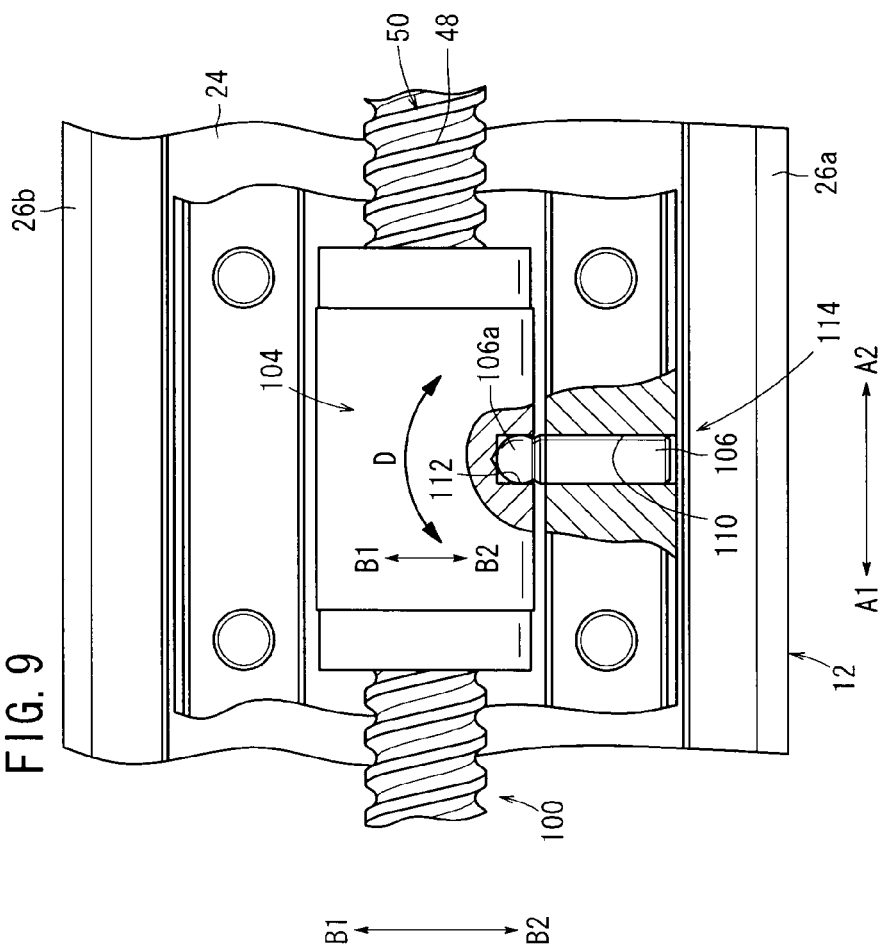
FIG. 9 is an enlarged plan view showing the vicinity of the slider and displacement nut illustrated in FIG. 7.
Figure 10:
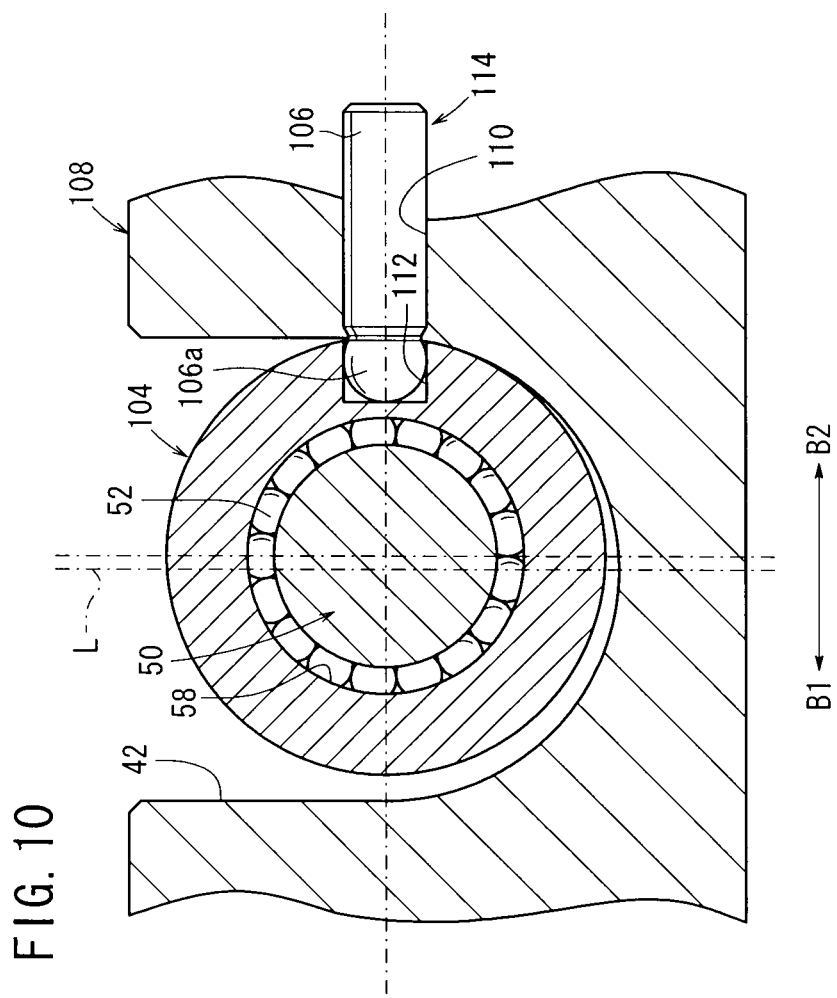
FIG. 10 is an enlarged transverse cross sectional view showing a case in which the feed screw shaft and the displacement nut of FIG. 7 are displaced in a horizontal direction along a pin.
Figure 11:
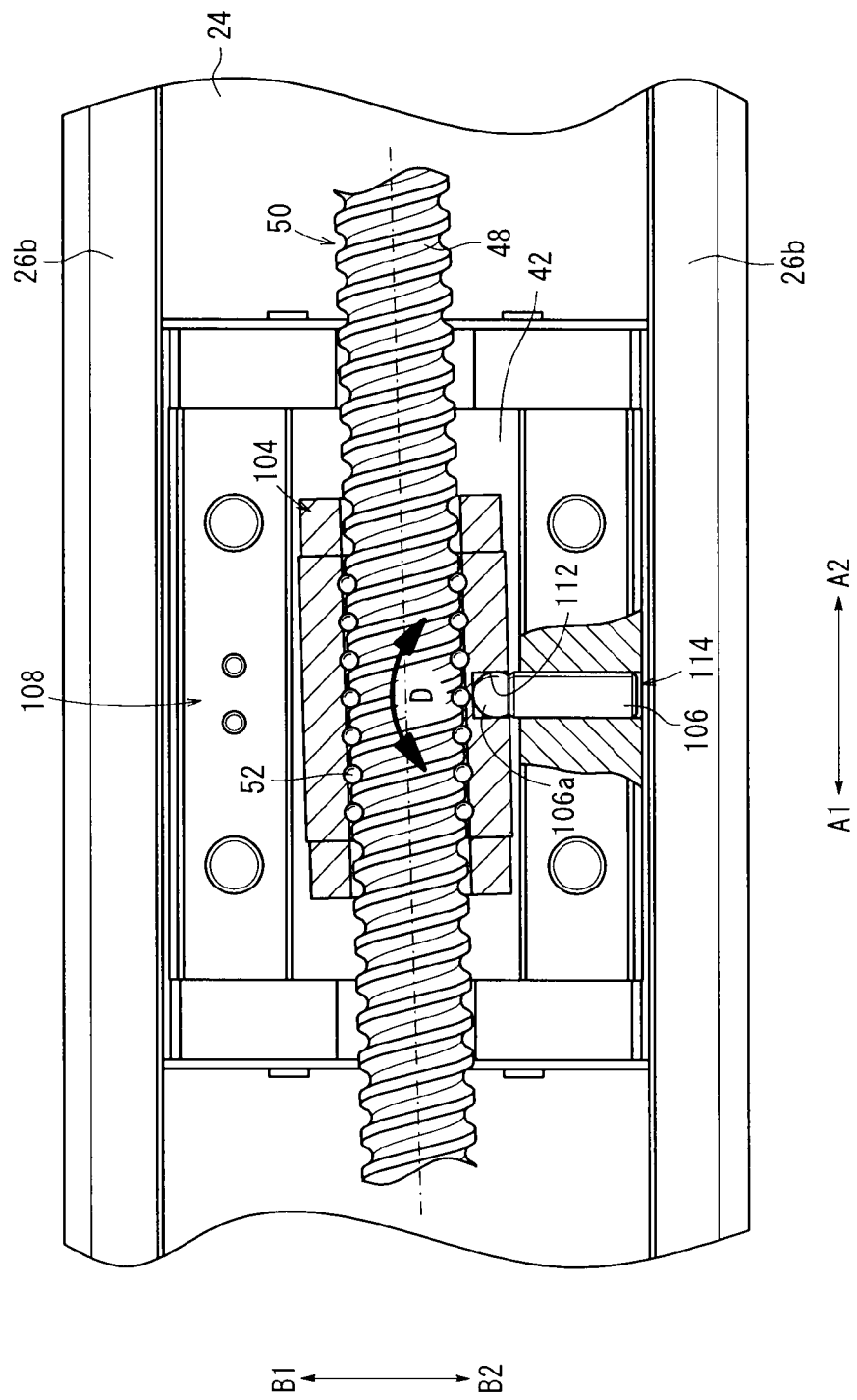
FIG. 11 is an enlarged cross sectional view showing a case in which the feed screw shaft and the displacement nut of FIG. 7 are tilted in a direction of moment on a horizontal surface, with the pin acting as a fulcrum.

As shown in FIGS. 7 through 11, the electric actuator 102, to which the feed screw mechanism 100 according to the second embodiment is applied, differs from the electric actuator 10, to which the feed screw mechanism 22 according to the aforementioned first embodiment is applied, in that the displacement nut (displaceable body) 104 is supported through a pin 106 for movable displacement in a widthwise direction (the direction of arrows B1 and B2) of the slider 108, in a direction of rotation (the direction of arrow C in FIG. 8) about the pin 106, and in a direction of moment (the direction of arrow D in FIG. 7).

In the feed screw mechanism 100, a first pin hole 110 is formed on one side portion in the slider 108, and a second pin hole 112 is formed similarly in the displacement nut 104. More specifically, the first and second pin holes 110, 112 are formed one each, perpendicularly to an axial line of the slider 108 and the displacement nut 104. In addition, a pin 106, which is formed with a spherical shape on a distal end 106a thereof, is inserted in the first and second pin holes 110, 112.

The pin 106 is lightly press-inserted and fitted into the first pin hole 110 from a side of the slider 108, and the one end portion thereof is fixed so as not to protrude from an end surface of the slider 108, wherein the distal end 106a that forms the other end portion thereof protrudes a given length from the first pin hole 110 on the side of the displacement nut 104 and is inserted displaceably with respect to the second pin hole 112, which is formed with a diameter at least larger than the diameter of the pin 106.

More specifically, the pin 106 is fixed in the slider 108 via the first pin hole 110, and functions as a support mechanism 114, which is capable of supporting the displacement nut 104 via the second pin hole 112 displaceably in a horizontal direction (the direction of arrows B1 and B2) perpendicular to the direction of displacement (the direction of arrows A1 and A2) of the displacement nut 104, together with supporting the displacement nut 104 displaceably in a direction of rotation (the direction of arrow C) about the second pin hole 112, and supporting the displacement nut 104 displaceably in a direction of moment (the direction of arrow D) on a horizontal surface, with the distal end 106a inserted in the second pin hole 112 acting as a fulcrum.

In the foregoing manner, according to the second embodiment, the displacement nut 104 is displaceably supported via a single pin 106 in three directions, including a widthwise direction of the slider 108, a direction of rotation centrally about the pin 106, and a direction of moment on a horizontal surface with the end 106a of the pin 106 acting as a fulcrum. Owing thereto, for example, even in the case that bending of the feed screw shaft 50 occurs, by relative displacement of the displacement nut 104 via the single pin 106, in a widthwise direction (horizontal direction) with respect to the slider 108, in a direction of rotation centrally about the pin 106, and in a direction of moment on a horizontal surface with the end 106a of the pin 106 acting as a fulcrum (see FIG. 11), any variances due to such bending or the like of the feed screw shaft 50 can suitably be absorbed.

As a result, application of uneven loads with respect to the slider 108, which are of concern when variances occur in the feed screw shaft 50, the displacement nut 104, or the like that make up the feed screw mechanism 22, can be prevented, and displacement resistance of the slider 108 caused by such uneven loads can more reliably and suitably be suppressed.

Consequently, the electric actuator 102 including the feed screw mechanism 100 can avoid the occurrence of operational defects due to product differences or errors in assembly or the like, so that the slider 108 can be displaced more smoothly in a straight line along the axial direction.

In the feed screw mechanisms 22, 100 according to the above-described first and second embodiments, cases have been described in which plural balls 52 are disposed to intervene between the feed screw shaft 50 and the displacement nut 104, and a rotational force of the feed screw shaft 50 is transmitted via the balls 52 to the displacement nut 104, i.e., cases in which a ball screw mechanism is utilized. However, the present invention is not limited to such a structure. For example, a structure may be used in which female screw threads formed on an inner circumferential surface of the displacement nut are screw-engaged in direct contact with male screw threads, which are engraved on the outer circumferential surface of the feed screw shaft.

The feed screw mechanism according to the present invention is not limited to the aforementioned embodiments, and it goes without saying that various modified or additional structures could be adopted therein without deviating from the essence and gist of the present invention as set forth in the appended claims.

What is claimed is:

1. A feed screw mechanism for use in an actuator having a slider which is displaceable along an axial direction of a body, comprising:
    a feed screw shaft engraved with screw threads on an outer circumference thereof;
    a displaceable body screw-engaged with the screw threads and disposed on an outer circumferential side of the feed screw shaft to be displaced along the feed screw shaft by rotation of the feed screw shaft; and
    a support mechanism that includes a single pin inserted in a second pin hole in the displaceable body, the pin is press-inserted and fitted into a first pin hole in the slider, and the pin prevents rotation of the displaceable body with the feed screw shaft,
    wherein the pin transmits a driving force from the feed screw shaft to the slider to displace the slider along the feed screw shaft with the displaceable body,
    wherein the pin of the support mechanism is displaceably positioned in the second pin hole in the displaceable body to act as a fulcrum such that the displaceable body is displaceable in three directions relative to the slider,
    wherein an axis of the pin extends from an end of the pin inserted in the second pin hole toward a center of the feed screw shaft,
    wherein the end of the pin is formed in a spherical shape,
    wherein the end of the pin is in contact with the second pin hole in at least two places on radially opposite sides of the spherical shape, and
    wherein the end of the pin is in contact with the second pin hole in a third place on an end-most point of the spherical shape in an axial direction of the pin.

2. The feed screw mechanism according to claim 1, wherein the three directions of displacement of the displaceable body with respect to the slider include displacement in a horizontal direction perpendicular to a direction of displacement of the slider.

3. The feed screw mechanism according to claim 2, wherein the pin is disposed perpendicular to the direction of displacement of the slider so as to extend from the slider into the second pin hole in displaceable body.

4. The feed screw mechanism according to claim 3, wherein the three directions of displacement of the displaceable body with respect to the slider include displacement in a rotational direction about the pin in the second pin hole.

5. The feed screw mechanism according to claim 4, wherein the three directions of displacement of the displaceable body with respect to the slider include displacement in a direction of moment on a horizontal surface.

6. The feed screw mechanism according to claim 1, wherein the actuator comprises a driving unit, the driving unit being connected to the feed screw shaft and driven rotatably by supply of electricity thereto.

7. The feed screw mechanism according to claim 1, wherein the displaceable body is accommodated in a recess of the slider, and a clearance is provided between the displaceable body and the recess.

* * * * *